United States Patent [19]
Cluff et al.

[11] Patent Number: 5,867,125
[45] Date of Patent: Feb. 2, 1999

[54] INCREMENTAL PHASE AND DISTANCE MEASUREMENT THROUGH DIGITAL PHASE SIGNATURE COMPARISON

[76] Inventors: Larry A. Cluff, 27712 SW. Grahams Fy Rd., Sherwood, Oreg. 97140; Trevor J. Gerber, 442 N. 750 East, Provo, Utah 84606

[21] Appl. No.: 575,296

[22] Filed: Dec. 20, 1995

[51] Int. Cl.$^6$ .................................................. G01S 5/04
[52] U.S. Cl. ........................ 342/442; 342/127; 367/125
[58] Field of Search .................................. 342/127, 442, 342/458; 367/125

[56] References Cited

U.S. PATENT DOCUMENTS

| | | | |
|---|---|---|---|
| 3,328,688 | 6/1967 | Brooks | 324/83 |
| 3,430,148 | 2/1969 | Miki | 328/133 |
| 3,509,476 | 4/1970 | Roth | 328/134 |
| 3,517,322 | 6/1970 | Lay | 328/133 |
| 3,577,144 | 5/1971 | Girault | 343/14 |
| 3,636,250 | 1/1972 | Haeff | 178/6.5 |
| 3,657,659 | 4/1972 | Johnson | 328/133 |
| 3,849,671 | 11/1974 | Molack | 307/232 |
| 4,580,046 | 4/1986 | Sasaki et al. | 250/231 |
| 4,654,586 | 3/1987 | Evans, Jr. et al. | 324/83 |
| 4,833,480 | 5/1989 | Palmer et al. | 342/125 |
| 5,180,922 | 1/1993 | Hug | 250/561 |
| 5,194,906 | 3/1993 | Kimura | 356/5 |
| 5,220,332 | 6/1993 | Beckner et al. | 342/125 |
| 5,233,353 | 8/1993 | Guena et al. | 342/125 |
| 5,298,904 | 3/1994 | Olich | 342/42 |
| 5,349,358 | 9/1994 | Canal | 342/128 |
| 5,430,537 | 7/1995 | Liessner et al. | 356/5.1 |
| 5,495,252 | 2/1996 | Adler | 342/127 |

*Primary Examiner*—Thomas H. Tarcza
*Assistant Examiner*—Dao L. Phan

[57] ABSTRACT

A displacement measuring method that measures phase changes between a reference and a phase-shifted signal from $-\infty$ to $\infty$ degrees (limited by the size of counters) in precise incremental steps using a method referred to as Digital Phase Signature Comparison. Digital Phase Signature Comparison uses an n-bit digital pulse train synchronized to a reference signal to sample a binary phase-shifted signal of a known duty cycle. This n-bit sampling creates a unique phase signature which is stored in a memory device. One digital n-bit phase signature is created for each synchronized pulse train. Each stored phase signature is compared with the previous phase signature to determine whether the phase of the phase-shifted signal has changed, the magnitude of that change, and the direction of displacement. Error detection can protect against unknown phase signatures and phase signature transitions, thus eliminating accumulated or incident inaccuracies.

18 Claims, 13 Drawing Sheets

1 1 1 1

0 1 1 1

0 0 1 1

0 0 0 1

0 0 0 0

1 0 0 0

1 1 0 0

1 1 1 0

INCREMENTAL PHASE AND DISTANCE MEASUREMENT THROUGH DIGITAL PHASE SIGNATURE COMPARISON

BACKGROUND —FIELD OF INVENTION

This invention relates to digital phase measuring devices that incrementally measure phase, phase changes, and/or phase displacement; which can be used in tracking systems, proximity measurement devices, velocimeters, accelerometers, displacement measuring devices, and phase demodulation.

BACKGROUND —DESCRIPTION OF PRIOR ART

Many businesses supply customers with devices that are capable of measuring physical displacement of an object, measuring distance, or tracking an object as it moves through three-dimensional space. These devices range from complex radar systems that accurately track an airplane as it moves above a city, to virtual reality devices that track movements of specific body parts.

These systems use various mediums such as radio, light, sound, or magnetic fields for detecting or measuring distance or displacements. There are various distance or displacement measuring techniques for the various transmission mediums. Radar, interferometry, sonar, magnetic proximity sensors, and phase detectors are examples of devices capable of detecting movements, absolute distances, or displacements. This patent introduces a measuring system that can be utilized in many transmission mediums including radio, light, sound, etc.

Indirectly, devices that measure phase are also capable of measuring distance—since distance is related to the wavelength of a signal through a transmission medium. There are a number of phase measuring devices that can measure phase up to or exceeding 360 degrees. U.S. Pat. No. 3,430,148 (1969) to Miki is limited to measuring phase displacements of 360 degrees and the output is a variable-width pulse proportional to the phase difference. U.S. Pat. No. 3,657,659 (1972) to Johnson discloses a system that can measure intervals of phase greater than 360 degrees, limited to a resolution of 360 degrees. U.S. Pat. No. 3,509,476 (1970) to Roth utilizes a frequency measurement to determine phase. According to the disclosure, only by "increasing the number of signal channels" can Roth's system measure phase increments. Thus, only by increasing the complexity and redundancy of the disclosed system can phase differences be measured. U.S. Pat. No. 3,517,322 (1970) to Lay discloses a device that indicates which of two signals is leading the other signal where the phase relationship between the two signals is fixed. Thus, Lay's system cannot measure small amounts of phase change between two signals, only the polarity. U.S. Pat. No. 3,849,671 (1974) to Molack measures the phase between two signals by introducing a phase shift to one of the signals to bring the two signals into phase. The amount of phase shift required to bring the two signals into phase with each other is identical to the original phase relationship between the two signals. Molack's system does not measure phase differences of over 360 degrees. U.S. Pat. No. 4,580,046 (1986) to Sasaki et al. discloses a method of measuring phase up to 360 degrees. U.S. Pat. No. 5,233,353 (1993) to Guena et al. discloses a method of measuring phase shifts which can exceed 360 degrees, limited to 90 degree increments.

Although many of the systems mentioned above perform well in their intended applications, these systems, and similar systems, suffer from a number of disadvantages when used in range-finder applications:

(a) No simple methods exist to measure distance and/or phase change which can be applied over multiple mediums (such as radio, light, sound, or magnetics) with the analog portions of the system operating under steady state conditions.

(b) Some systems are limited by how fast a pulse or burst transmission can be resolved (radar, sonar).

(c) Accuracy is limited by transducer transient response (ultrasonic transducers, Hall Effect sensors, LC tank circuits, etc).

(d) Many of these systems require modulating a carrier signal, which consumes bandwidth.

(e) Current phase-based distance measuring systems capable of measuring displacements of greater than one wavelength with better than 90 degrees of resolution require complex, redundant circuitry.

OBJECTS AND ADVANTAGES

Several objects and advantages of the present invention are:

(a) To provide a simple method to measure distance and phase change, which can be applied over multiple mediums (such as radio, light, sound, or magnetics), with the analog portions of the system operating under steady state conditions.

(b) To provide a displacement and phase measuring system that is not dependant on timing an echo, or timing transmission of a pulse or burst.

(c) To provide a displacement and phase measuring system that improves accuracy of systems limited by transient transducer response.

(d) To provide a displacement and phase measuring system that transmits only a carrier signal, conserving bandwidth.

(e) To provide a simple phase-based distance measuring system that can measure physical displacements of both less than and greater than one wavelength, with better than 90 degrees of resolution (increments of 45 degrees, 22.5 degrees, etc).

OTHER OBJECTS AND ADVANTAGES ARE:

(f) To provide a phase detector that will measure precise increments of phase change from $-\infty$ to $\infty$ degrees by using a method referred to as Digital Phase Signature Comparison (DPSC).

(g) To provide a phase detector that will measure precise increments of displacement of an object by using Digital Phase Signature Comparison (DPSC).

(h) To provide a displacement and phase measuring system that is accurate and low-cost.

(i) To provide a system that measures absolute phase or displacement from $-\infty$ to $\infty$ degrees when measurement starts within one wavelength of a transmitter, and measure relative phase or displacement from $-\infty$ to $\infty$ degrees when measurement starts at a distance greater than one wavelength from a transmitter.

(J) To provide a system that can be used in conjunction with existing tracking or displacement measuring systems to measure absolute phase or displacement from $-\infty$ TO $\infty$ degrees when measurement starts over one wavelength from a transmitter.

(k) To provide a system that measures displacement frequently enough to allow for the design of better velocimeters, accelerometers, displacement meters, or other displacement measuring devices.

(L) To provide methods to use inexpensive, low-frequency circuitry to measure phase and displacements between high-frequency signals.

Further objects and advantages of the disclosed invention will become apparent from a consideration of the drawings and ensuing description.

DRAWING FIGURES

DESCRIPTION—FIGURES 1 to 4

In contrast with the methods referred to above (and other methods which are capable of phase and/or displacement detection), this invention creates a digital phase signature for the phase relationship between a reference signal and a phase-shifted signal. This phase signature is compared with a previously acquired phase signature to determine the incremental change of phase and the direction of that change. (Refer to FIG. 1)

This invention finds application in a range finder that will dynamically measure distance from a synchronized starting point. Traditional range finders measure the time between emitting a signal and detecting the echo. The DPSC range finder application uses phase signatures to measure phase shifts, which represent physical displacements. Distance is computed by aggregating in a counter the incremental changes in phase signatures between a reference signal which drives a transmitter and a phase-shifted signal derived from a receiver. This aggregation begins from a known starting point (with phase signatures incrementing for physical displacement in one direction and decrementing for the other direction).

There are two methods of synchronizing the starting point. The first method is to position the transmitter and receiver within one wavelength of each other (½ wavelength if the phase-shifted signal is reflected from the object being tracked). Under these conditions, the phase signature represents an absolute distance between the range finder and the object being tracked. Once absolute distance is known, changes in phase signature (representing physical displacements) are aggregated to determine the object's displacement. The second method of synchronizing the starting point is to start aggregating phase changes from a known physical starting point. Aggregated changes in phase then represent changes in physical displacement from the original starting point.

Figure 1:
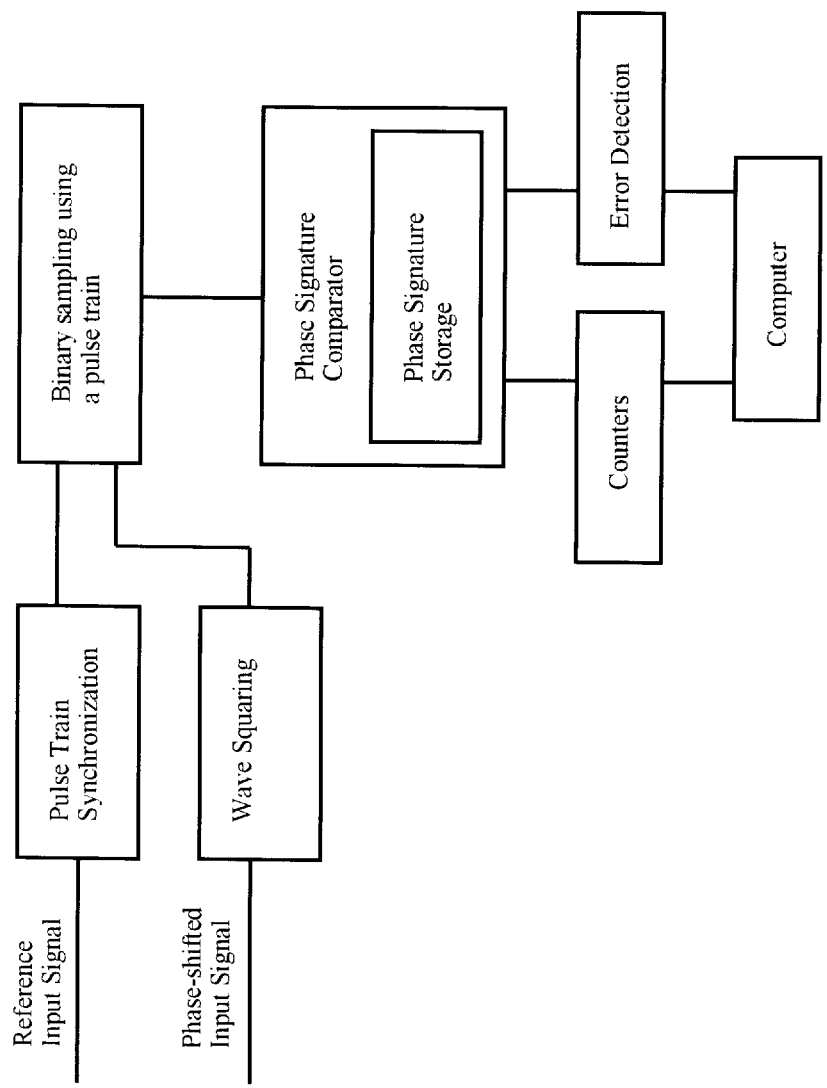
FIG. 1 shows a system incorporating Digital Phase Signature Comparison.
Figure 2A:
FIGS. 2A to 2D shows a method for obtaining a 4-bit phase signature.
Figure 2B:
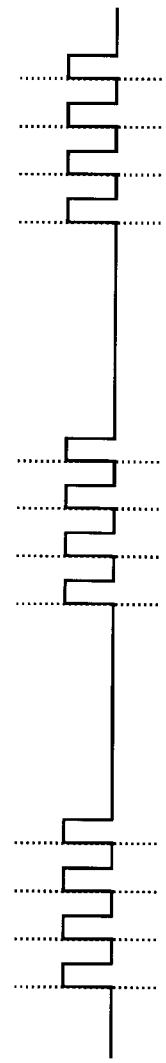
Figure 2C:
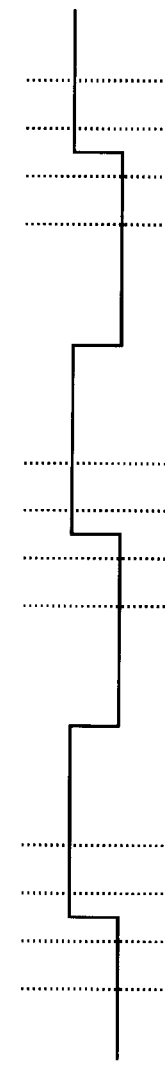
Figure 2D:
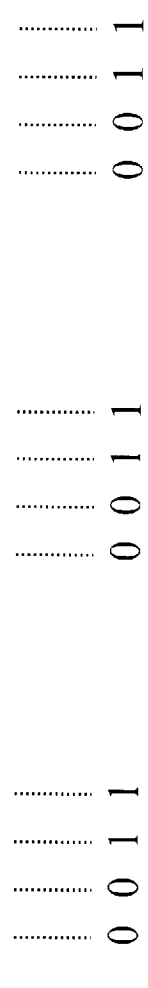

Although DPSC is capable of n-bit accuracy, the following 4-bit example shows how DPSC works:

FIG. 2A shows a square wave reference signal of a given frequency which may have been generated from a sine wave of the same frequency. FIG. 2C shows a square wave phase-shifted input signal of the same frequency. FIG. 2B shows a 4-bit pulse stream synchronized to the reference signal. FIG. 2D shows the 4-bit phase signature corresponding to the phase-shifted input signal 2C. As input signal 2C changes in phase with respect to reference signal 2A, the phase signature will show corresponding changes.

A given phase signature can be clocked into a shift register or other memory device and stored for future comparisons by a state machine, bit comparator, microprocessor, or microcontroller. The comparison of successive signatures will determine the direction and magnitude of the phase shift and can be readily implemented in the form of a digital state machine, ROM look-up table, bitwise comparitor, or through a computer program if the processor speed is sufficient.

FIGS. 3A–3H show successive digital phase signatures, with 4-bit resolution, of an input signal that begins in phase with a reference signal at 3A. The input signal then incrementally advances through one-half cycle to be 180 degrees out of phase at 3E. As the input signal further advances, through 3H, it returns back to being in phase at 3A.

Figure 3A:
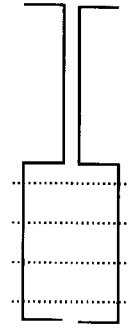
FIGS. 3A to 3H shows how a 4-bit phase signature can incrementally represent the phase of a signal over one complete cycle.
Figure 3B:
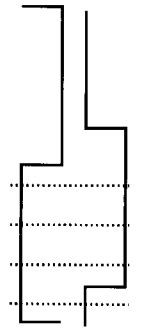
Figure 3C:
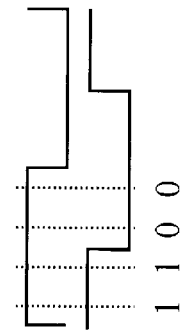
Figure 3D:
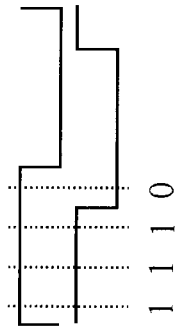
Figure 3E:
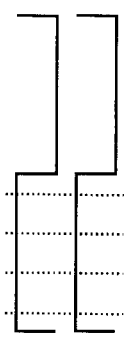
Figure 3F:
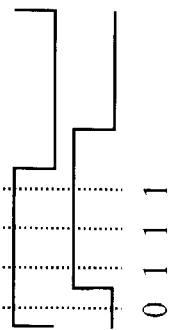
Figure 3G:
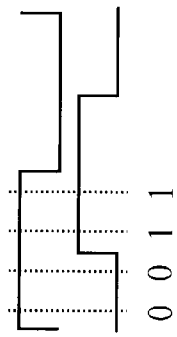
Figure 3H:
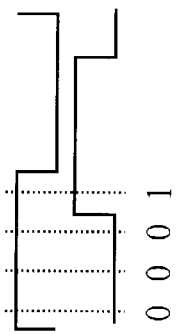

To illustrate how distance and/or direction changes are detected, an arbitrary starting point will be selected. For this example, FIG. 3C is the starting point. Phase sampling is done frequently enough to ensure that the next phase signature from the initial point 3C must be either 3B, 3D, or 3C. Given the previous phase signature and the current phase signature, the direction of the change of the phase-shifted signal with respect to the reference can be determined—as well as the amount of phase shift—limited by the n-bit resolution of the pulse stream shown in FIG. 2B. Each incremental change in phase signature can represent a physical displacement through a transmission medium. Each increment of phase change is valued according to the equation:

$$\Delta d = \frac{\lambda}{2n}$$

Where $\Delta d$ is the spatial distance represented by a single incremental phase change, $\lambda$ is the wavelength of the reference signal in 2A, and n is the number of pulses in pulse stream 2B (per period of the reference signal 2A). A counter is incremented or decremented according to each successively sampled change in phase signature and the relative distance can then be calculated.

Error control can be incorporated into the system. Phase signatures can be checked for their validity. If two successive phase signatures indicate an unacceptable increment of phase change, an error signal can be generated. Compensation can be made for phase signature comparisons which indicate more phase change than a single increment. One example is to use a look-up table to direct counters to count more than a single increment of phase shift in the correct direction. Thus, faster changing phases can be tracked successfully.

FIG. 4 shows a method of creating a phase signature incorporating an aliasing technique. This allows low-frequency circuits to resolve and create unique phase signatures for higher frequency signals. This technique can be used in radio frequency phase detection and measurement.

Figure 4A:
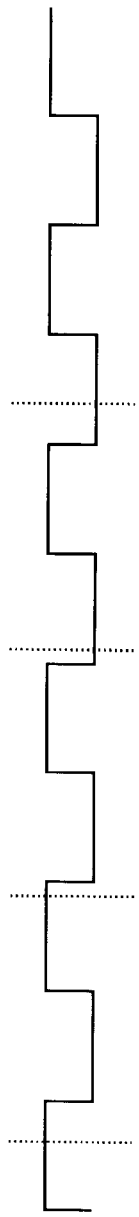
FIGS. 4A to 4D shows how a 4-bit phase signature can be obtained from a high-frequency signal using low-frequency sampling.
Figure 4B:
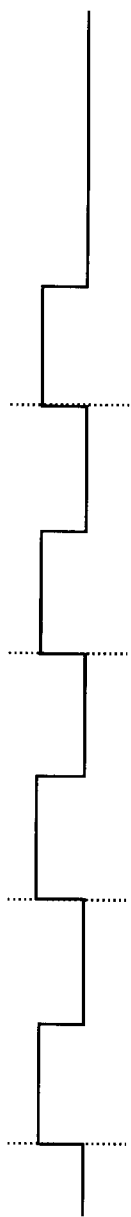
Figure 4C:
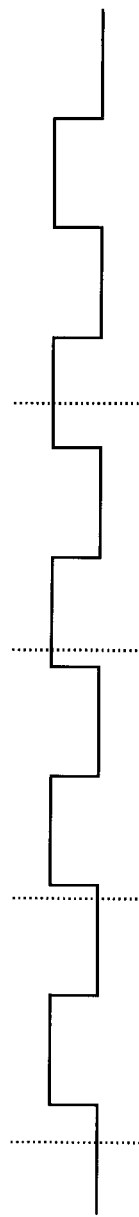
Figure 4D:

FIG. 4D shows a phase signature created by aliasing. FIG. 4A is the reference signal. FIG. 4C is the phase-shifted signal to be compared to the reference signal. FIG. 4B is the clock signal that loads the phase signature into a memory device. Rather than taking n-bit samples in each cycle of the reference wave (as shown in FIG. 2) the sampling is spread over a number of cycles of the reference signal. This will create a unique phase signature in much the same manner as the technique shown in FIGS. 2 and 3.

Another technique for using DPSC on high frequency signals is to use a mixer to convert the high frequency phase-shifted signal to a lower frequency which can be sampled by a pulse train. The mixer preserves the phase relationships between the high frequency signal being received, and the lower frequency created in the mixer.

OPERATION—FIGURES 5 to 12

First Embodiment

Figure 5:
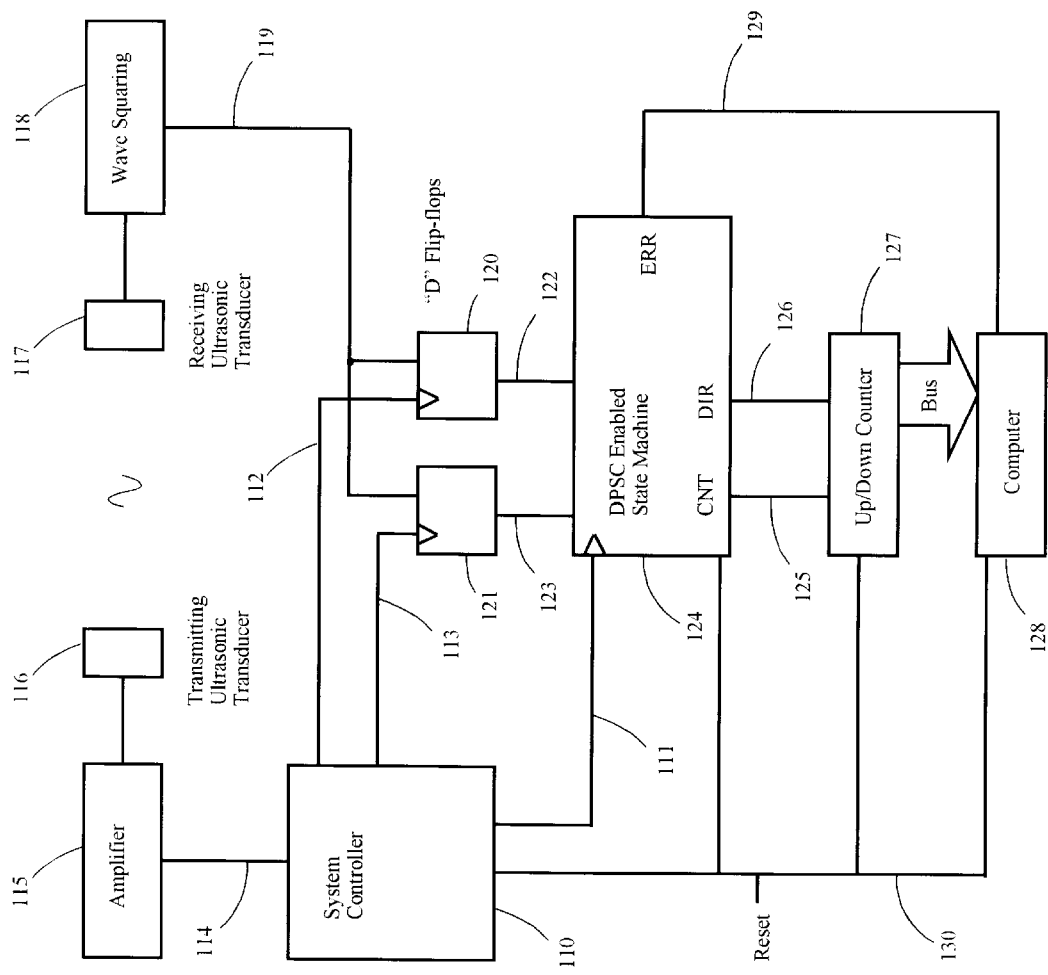
FIG. 5 shows an ultrasonic range finder incorporating Digital Phase Signature Comparison by using a state machine.

FIG. 5 shows a system incorporating a state machine to accomplish 2-bit Digital Phase Signature Comparison. This system consists of system controller 110, amplifier 115, transmitting ultrasonic transducer 116, receiving ultrasonic transducer 117, wave squaring circuitry 118, flip-flops 120 and 121, state machine 124, up/down counter 127, and computer 128.

System controller 110 generates a number of synchronized signals which are shown in FIG. 6. FIG. 6A shows signal 114 which passes through amplifier 115 and is then transmitted by ultrasonic transducer 116. This transmitted signal is received as a phase-shifted sinusoid by receiving ultrasonic transducer 117 and converted to a square wave (signal 119, FIG. 6B), by wave squaring circuitry 118. This conversion can be implemented using a comparator or other device that will preserve the frequency and phase of the signal while converting it to a square wave.

Figure 6A:
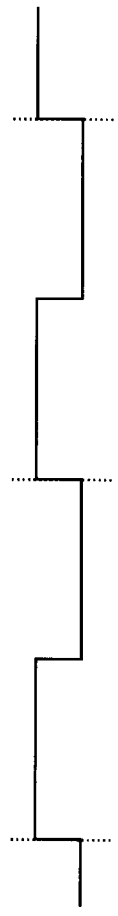
FIGS. 6A to 6E show the timing diagram for various signals in FIG. 5.
Figure 6B:
Figure 6C:
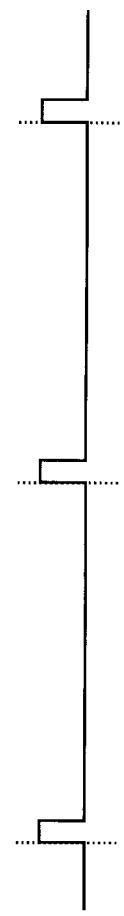
Figure 6D:
Figure 6E:

System controller 110 also generates signals 112 and 113 shown in FIG. 6C and 6D respectively. These signals clock flip-flops 120 and 121, which in turn sample binary phase-shifted signal 119 at 0 and 90 degree phase displacements with respect to the reference signal shown in FIG. 6A. After the two flip-flops 120 and 121 are updated, state machine 124 is clocked twice by signal 111 which is shown in FIG. 6E. This cycle of clocking the two flip-flops and the state machine continues indefinitely.

Figure 7:
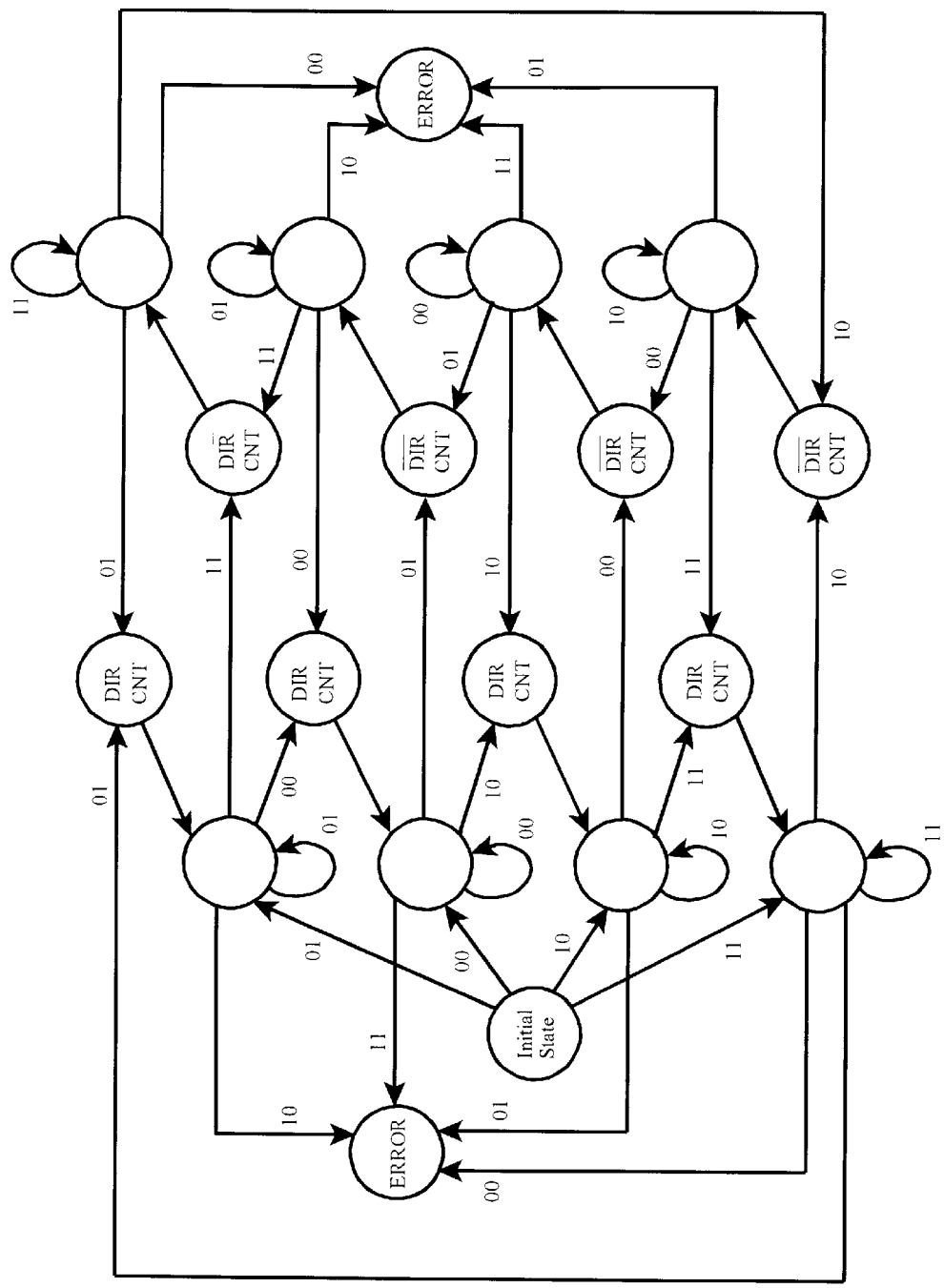
FIG. 7 shows a state diagram for the range finder of FIG. 5.

A state machine implementing DPSC is diagramed in FIG. 7. The state of two inputs to the state machine determine its next state. Initially, the state machine reads the inputs 122 and 123 which can logically be 00, 01, 11, or 10. The state machine's inputs are only allowed to change sequentially forward or sequentially backward: (00⇋10⇋11⇋01⇋00). If the sequence is not followed, the state machine enters an error state and asserts error signal 129. Error signal 129 is accessible to computer 128 allowing the computer to indicate an error to the user. For example, if the state machine's inputs are 11, the inputs can change to 01, 10, or remain as 11. If the state machine's inputs change from 11 to 00 then it will enter an error state. Recovery from an error state is accomplished by resetting state machine 124 and up/down counter 127 with reset signal 130. Reset signal 130 can be controlled manually or by computer 128.

A sequential change of the inputs (122 and 123) to the state machine will cause the machine to cycle through the states, asserting direction signal 126 on the left side of the state diagram, deasserting it on the right side. There are eight states where the state machine will assert count signal 125. The count signal clocks up/down counter 127. The direction of the count is determined by direction signal 126. Each count in up/down counter 127 represents an incremental phase displacement. The outputs of up/down counter 127 represent the total phase displacement since the counters were reset. Count signal 125, direction signal 126, error signal 129, and the outputs of up/down counter 127 are accessible for computer 128 to process.

Assuming a sound velocity of 345 meters per second, and an ultrasonic transmission frequency of 40 kHz, the physical wavelength of the ultrasonic signal in air is 8.63 mm (0.34 inches). This embodiment is capable of measuring phase displacements of approximately 90 degrees. A 90 degree phase displacement between the ultrasonic transmitter and the ultrasonic receiver results from physical displacement of approximately 2.16 mm (0.085 inches). Thus, physical displacements are measured as phase displacements according to the formula:

$$\Delta d = \frac{\lambda}{2n}$$

Where $\Delta d$ is the spatial distance represented by a single incremental phase change, $\lambda$ is the wavelength of the ultrasonic transmission, and n is the number of sampling pulses per cycle of the reference signal (n=2 for this embodiment, FIG. 6C plus FIG. 6D). Total physical displacement is proportional to the total phase displacement represented by the outputs of up/down counter 127.

The advantages of this implementation are that it is easy to implement, it has built in error detection, and it can be expanded to use larger phase signatures—improving resolution. It also has the advantage that only a carrier is transmitted—no other transmission medium bandwidth is required when only the receiver is moved. More bandwidth would be required if the transmitter were moved.

A disadvantage of this embodiment is that it would be difficult to implement in situations where large phase signatures are required. This situation occurs when using long wavelength transmission signals and where high accuracy is required.

Second Embodiment

Figure 8:
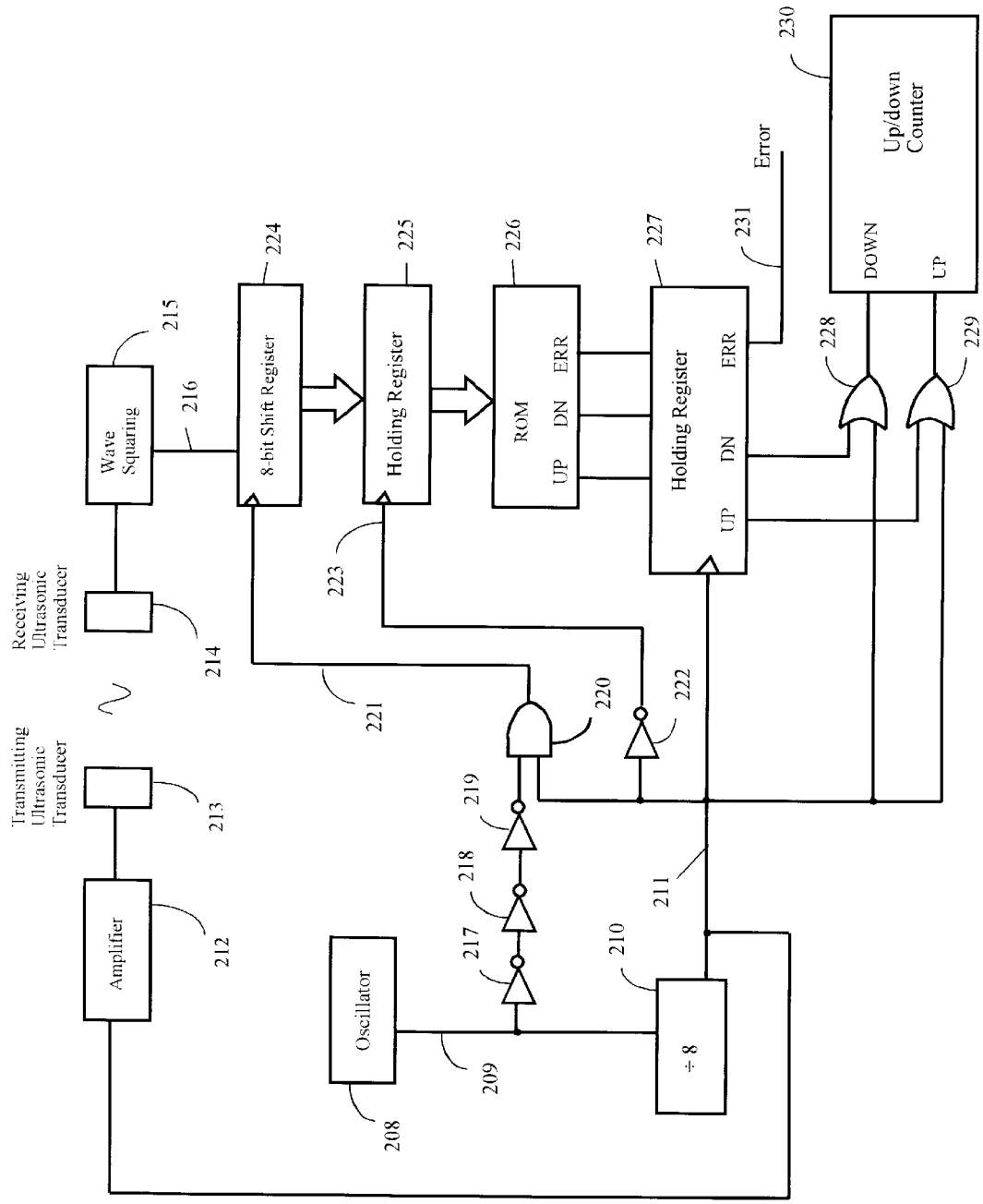
FIG. 8 shows an ultrasonic range finder incorporating Digital Phase Signature Comparison by using a ROM.

FIG. 8 shows an embodiment of DPSC which uses a ROM to compare phase signatures. This embodiment compares 4-bit phase signatures. This system is composed of oscillator 208, frequency divider 210, amplifier 212, transmitting ultrasonic transducer 213, receiving ultrasonic transducer 214, wave squaring circuitry 215, inverters 217, 218, 219 and 222, AND gate 220, eight-bit shift register 224, holding registers 225 and 227, ROM 226, OR gates 228 and 229, and up/down counter 230.

Figure 9A:
FIGS. 9A to 9D show the timing diagram for various signals in FIG. 8.
Figure 9B:
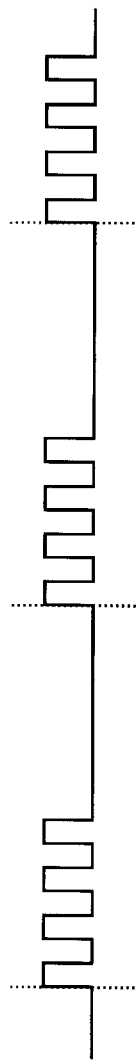
Figure 9C:
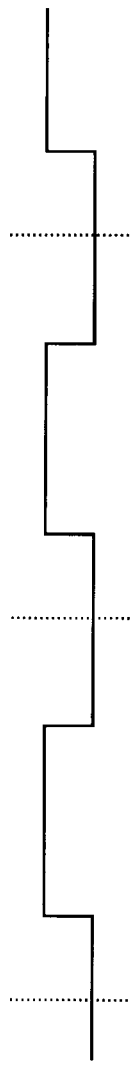
Figure 9D:
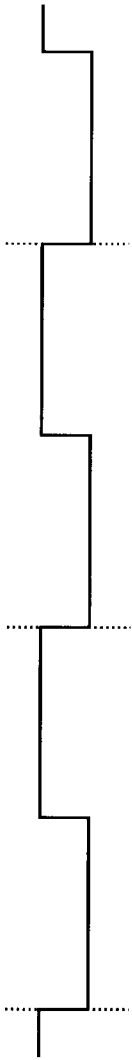

The system clock signal 209, which in this case is 320 kHz, is fed into frequency divider 210 that divides the signal by eight, producing reference signal 211 (FIG. 9A). Signal 211 is amplified by amplifier 212 and transmitted by ultrasonic transducer 213. The phase-shifted signal received by receiving ultrasonic transducer 214 is converted to binary signal 216 (FIG. 9C) by wave squaring circuit 215, and then fed to the data input of shift register 224.

Concurrently, clock signal 209 is delayed and inverted by inverters 217, 218, and 219. This delayed and inverted signal is ANDed with signal 211 to produce a four-bit pulse stream lasting ½ the period of reference signal 211. This four-bit pulse stream (Signal 221, FIG. 9B) clocks shift register 224. This clocking action will create a phase signature as signal 216 is sampled by shift register 224. Shift register 224 will hold two 4-bit phase signatures, although only one phase signature is created at a time. When a complete phase signature has been entered into shift register 224, holding register 225 will be clocked by signal 223 (FIG. 9D)—an inversion of signal 211. At the time holding register 225 is clocked, shift register 224 contains two complete phase signatures—the previous phase signature and the present phase signature. The previous phase signature is stored in the upper four bits of the output of shift register 224. The present phase signature is stored in the lower four bits of the output of shift register 224. These two complete phase signatures appear on the outputs of holding register 225.

The outputs of holding register 225 drive the address lines of ROM 226. Therefore, the two phase signatures clocked into holding register 225 cause ROM 226 to display the data addressed by the pair of phase signatures. ROM 226 is programmed to decode the relationship between the previous phase signature and the present phase signature appearing on its address lines. The ROM is programmed to output "11" if no phase shift was detected (the previous phase signature equals the present phase signature,) to output "10" if an incremental phase shift was detected in one direction, or to output "01" if an incremental phase shift was detected in the other direction.

The outputs of ROM 226 are latched by holding register 227 while the ROM outputs are stable. Holding register 227 is clocked on the leading edge of signal 211 (FIG. 9A).

OR gates 228 and 229 allow the outputs of holding register 227 to be strobed on the inputs of up/down counter 230 once per cycle of signal 211. Therefore, up/down counter 230 is clocked up when an incremental phase change is detected in one direction, and it is clocked down when an incremental phase change in the other direction is detected.

ROM 226 is also programmed to provide error detection. When either of the phase signatures appearing on the address lines—or the phase-shift increment represented by the pair of phase signatures—is not valid, the ROM asserts an output, indicating that an error condition has occurred. This error signal is a system output providing information regarding data integrity to the user or another system.

An advantage of this embodiment is that if the ROM outputs are reprogrammed, and count-to-n up/down counters are used, the system can count multiple phase-shift increments per period of the reference signal. This would allow for faster-changing phase relationships to be tracked successfully. It would also compensate for jitter in the phase-shifted signal. For example, the ROM can be programmed to assert one of six outputs: Count—up one, down one, up two, down two, up three, or down three. These outputs are latched by holding register 227 as previously described. The outputs of holding register 227 can be strobed by additional OR gates as previously described. The up/down counter would have six corresponding inputs, allowing the counter's output to increment or decrement by one, two or three.

Using the equations mentioned previously, this system is accurate to 1.08 mm (0.042 inches). This system is relatively inexpensive, and it can be expanded to provide greater resolution and tracking range.

Third Embodiment

Figure 10:
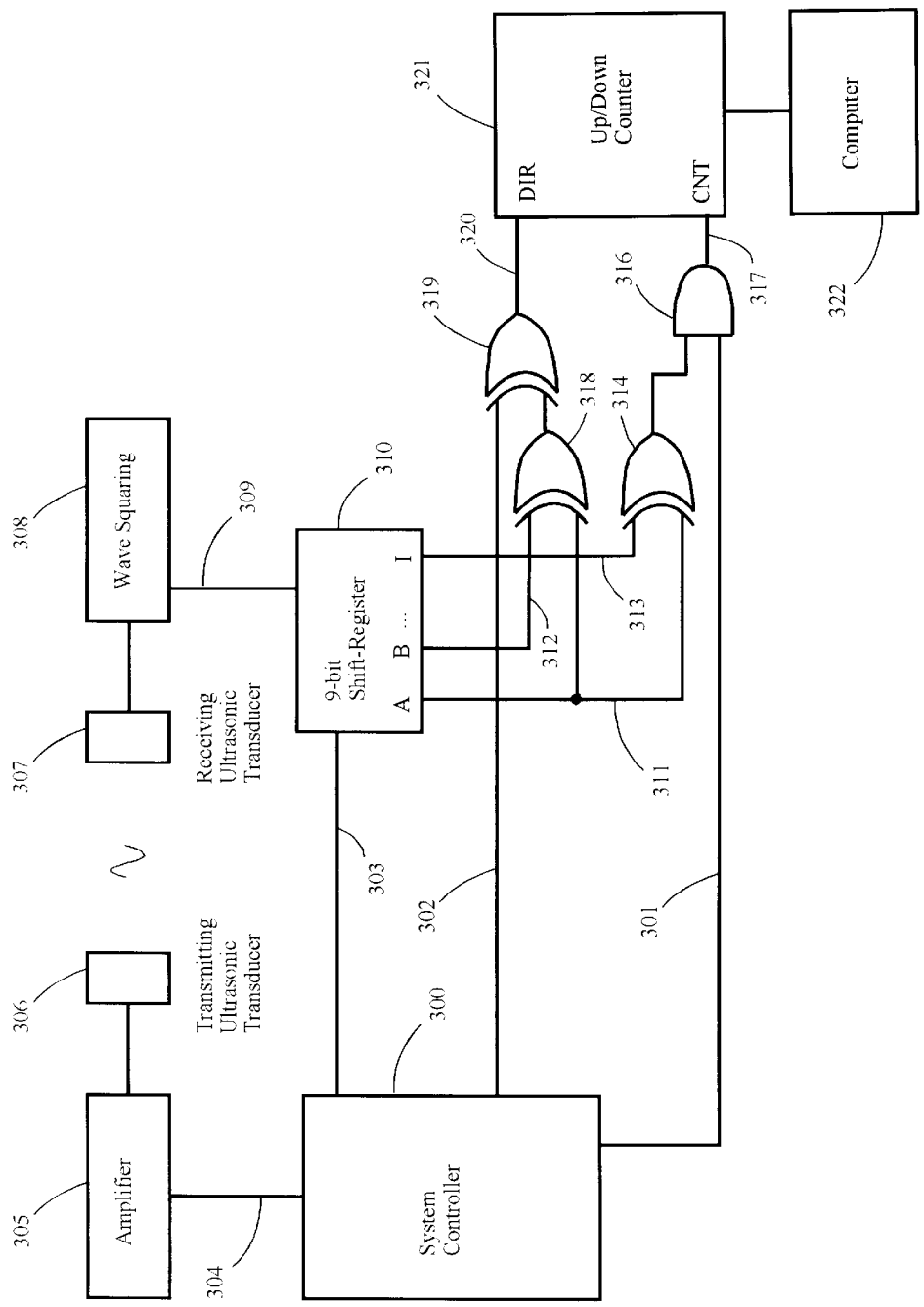
FIG. 10 shows an ultrasonic range finder incorporating Digital Phase Signature Comparison by using a bit-wise comparitor to compare phase signatures.

FIG. 10 shows an embodiment of DPSC as implemented in a system which compares phase signatures bit-by-bit. This embodiment uses system controller 300, amplifier 305, transmitting ultrasonic transducer 306, receiving ultrasonic transducer 307, wave squaring circuitry 308, 9-bit shift register 310, XOR gates 314, 318, and 319, AND gate 316, up/down counter 321, and computer 322.

Figure 11A:
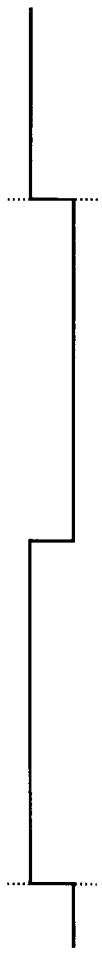
FIGS. 11A to 11E show the timing diagram for various signals in FIG. 10.
Figure 11B:
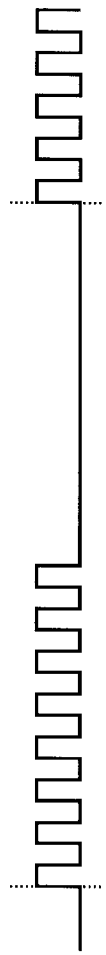
Figure 11C:
Figure 11D:
Figure 11E:
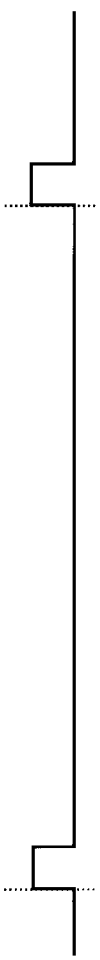

System controller 300 generates signal 304, as shown in FIG. 11A, which is amplified and transmitted by amplifier 305 and ultrasonic transducer 306 respectively. Receiving ultrasonic transducer 307 receives the transmitted signal, which is then converted to square wave 309 (FIG. 11C) using wave squaring circuitry 308. 9-bit shift register 310 samples binary signal 309 as the shift register is clocked by signal 303 (FIG. 11B).

As the samples are taken by the shift register, XOR gate 314 compares two 8-bit phase signatures as they are shifted bit-by-bit through the shift register. Output A (signal 311) is the least significant bit of the shift register; output I (signal 313) is the most significant bit. If signals 311 and 313 are not identical, the XOR gate will detect the change and assert its output. The system controller uses signal 301 (FIG. 11D) and AND gate 316 to pass this data comparison to up/down counter 321 after the shift register outputs have stabilized. Signal 317 clocks up/down counter 321.

There are sixteen possible phase signatures: 00000000, 00000001, 00000011, 00000111, 00001111, 00011111, 00111111, 01111111, 11111111, 11111110, 11111100, 11111000, 11110000, 11100000, 11000000, and 10000000. If the phase between signals 304 and 309 do not change, the same phase signature will be repeatedly clocked through 9-bit shift register 310. Thus, the output of XOR gate 314 will never assert. If the current phase signature differs from the last phase signature, XOR gate 314 will assert for each single bit difference between the two phase signatures. Each single bit difference clocks up/down counter 321 once. Each count represents an incremental phase shift, but the direction of phase shift has yet to be determined.

Tables 1 and 2 shows the possible contents of shift register 310 when XOR gate 314 asserts, causing counter 321 to increment or decrement. The shaded bits of Tables 1 and 2 are the previous phase signature. The present phase signature is represented by non-highlighted bits in positions A–H. For example, row 1 of Table 1 shows the contents of the shift register when XOR gate 314 asserts for a phase signature transition from 00000000 to 00000001. The table shows that the contents of shift register 310 will be 100000000. Using these tables, it can be shown that the direction of phase shift (signal 320) can be determined by the following formula:

$$\text{Direction} = (A \otimes B) \otimes A_p$$

where A is the contents of output A (signal 311) in shift register 310, B is the contents of output B (signal 312) in shift register 310, and $A_p$ is asserted if the first bit of the present phase signature is at output A of shift register 310. $A_p$ is signal 302 (FIG. 11E), generated by system controller 300. This formula is valid for systems utilizing n-bit phase signatures where $n \geq 3$.

It should be noted that the direction signal is valid only for single incremental phase changes (i.e. 00000000 to 00000001). Additional decoding logic can be implemented to provide a valid direction signal for phase signature transitions that indicate a phase shift exceeding one increment (i.e. 00000000 to 00000011).

Error Detection Embodiments

Figure 12:
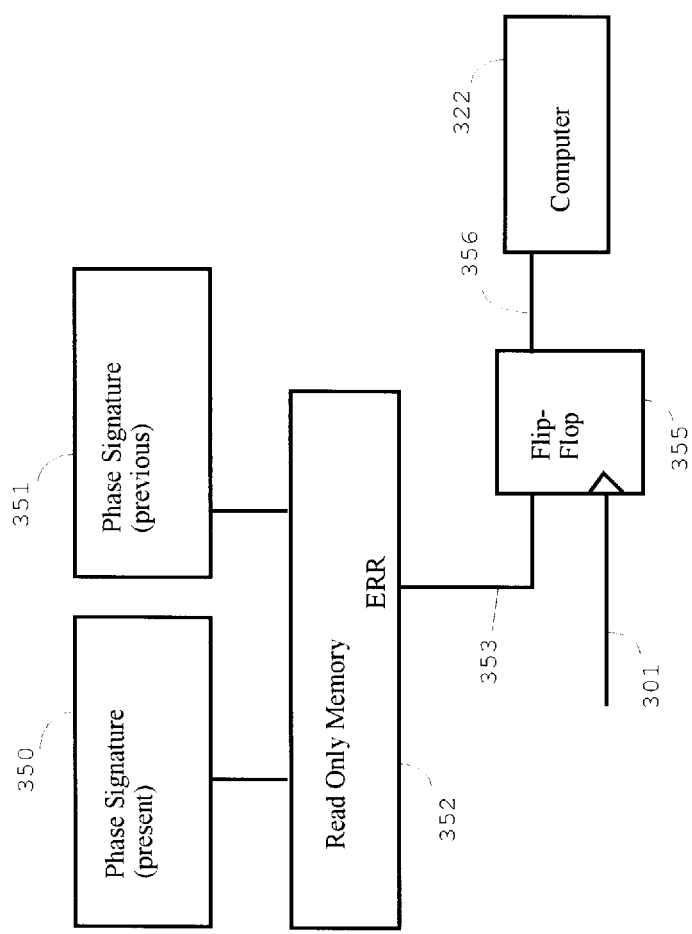
FIG. 12 shows a method for detecting errors in phase signatures, and a method for detecting errors in comparisons of phase signatures by using a ROM.

Error detection circuitry can be added to detect non-sequential phase signatures as well as invalid phase signatures. This error detection circuitry can be implemented in different levels and different ways. One method is shown in FIG. 12. This method uses ROM 352 to determine whether

TABLE 1

(Direction = UP)

| | Present Signature | Previous Signature | Shift Register Contents |
|---|---|---|---|
| | | | A B C D E F G H I |
| 1 | 00000001 | ← 00000000 | 1 0 0 0 0 0 0 0 0 |
| 2 | 00000011 | ← 00000001 | 1 1 0 0 0 0 0 0 1 |
| 3 | 00000111 | ← 00000011 | 1 1 1 0 0 0 0 0 1 1 |
| 4 | 00001111 | ← 00000111 | 1 1 1 1 0 0 0 0 1 1 1 |
| 5 | 00011111 | ← 00001111 | 1 1 1 1 0 0 0 0 1 1 1 1 |
| 6 | 00111111 | ← 00011111 | 1 1 1 1 1 0 0 0 1 1 1 1 1 |
| 7 | 01111111 | ← 00111111 | 1 1 1 1 1 1 0 0 1 1 1 1 1 1 |
| 8 | 11111111 | ← 01111111 | 1 1 1 1 1 1 1 0 1 1 1 1 1 1 1 |
| 9 | 11111110 | ← 11111111 | 0 1 1 1 1 1 1 1 0 |
| 10 | 11111100 | ← 11111110 | 0 0 1 1 1 1 1 1 0 |
| 11 | 11111000 | ← 11111100 | 0 0 0 1 1 1 1 1 0 0 |
| 12 | 11110000 | ← 11111000 | 0 0 0 0 1 1 1 1 0 0 0 |
| 13 | 11100000 | ← 11110000 | 0 0 0 0 0 1 1 1 0 0 0 0 |
| 14 | 11000000 | ← 11100000 | 0 0 0 0 0 0 1 1 0 0 0 0 0 |
| 15 | 10000000 | ← 11000000 | 0 0 0 0 0 0 0 1 0 0 0 0 0 0 |
| 16 | 00000000 | ← 10000000 | 0 0 0 0 0 0 0 0 0 0 0 0 0 0 0 |

TABLE 2

(Direction = DOWN)

| | Present Signature | Previous Signature | Shift Register Contents |
|---|---|---|---|
| | | | A B C D E F G H I |
| 1 | 10000000 | ← 00000000 | 1 0 0 0 0 0 0 0 0 0 0 0 0 0 0 |
| 2 | 11000000 | ← 10000000 | 1 0 0 0 0 0 0 1 0 0 0 0 0 0 |
| 3 | 11100000 | ← 11000000 | 1 0 0 0 0 0 1 1 0 0 0 0 0 |
| 4 | 11110000 | ← 11100000 | 1 0 0 0 0 1 1 1 0 0 0 0 |
| 5 | 11111000 | ← 11110000 | 1 0 0 0 1 1 1 1 0 0 0 |
| 6 | 11111100 | ← 11111000 | 1 0 0 1 1 1 1 1 0 0 |
| 7 | 11111110 | ← 11111100 | 1 0 1 1 1 1 1 1 0 |
| 8 | 11111111 | ← 11111110 | 1 1 1 1 1 1 1 1 0 |
| 9 | 01111111 | ← 11111111 | 0 1 1 1 1 1 1 1 1 1 1 1 1 1 1 |
| 10 | 00111111 | ← 01111111 | 0 1 1 1 1 1 1 0 1 1 1 1 1 1 |
| 11 | 00011111 | ← 00111111 | 0 1 1 1 1 1 0 0 1 1 1 1 1 |
| 12 | 00001111 | ← 00011111 | 0 1 1 1 1 0 0 0 1 1 1 1 |
| 13 | 00000111 | ← 00001111 | 0 1 1 1 0 0 0 0 1 1 1 |
| 14 | 00000011 | ← 00000111 | 0 1 1 0 0 0 0 0 1 1 |
| 15 | 00000001 | ← 00000011 | 0 1 0 0 0 0 0 0 1 |
| 16 | 00000000 | ← 00000001 | 0 0 0 0 0 0 0 0 1 |

This embodiment is capable of comparing large phase signatures. Larger phase signatures can be stored by using more shift registers, or by using a controller to store or read phase signature bits to or from an addressable memory. The disadvantage of this device is that it is not particularly adapted to detecting all possible errors with phase signatures or comparisons of phase signatures, although the following error detection circuits improve error detection capabilities:

a phase signature and phase signature transition is valid. The ROM is programmed to read two phase signatures. Through the ROM's programming, an error signal 353 is asserted if an unknown phase signature occurs, or if the pair of phase signatures is not valid. Flip-flop 355 latches signal 353 each time signal 301 asserts, allowing setup time for the ROM. Error signal 356 is available to computer 322.

Figure 13:
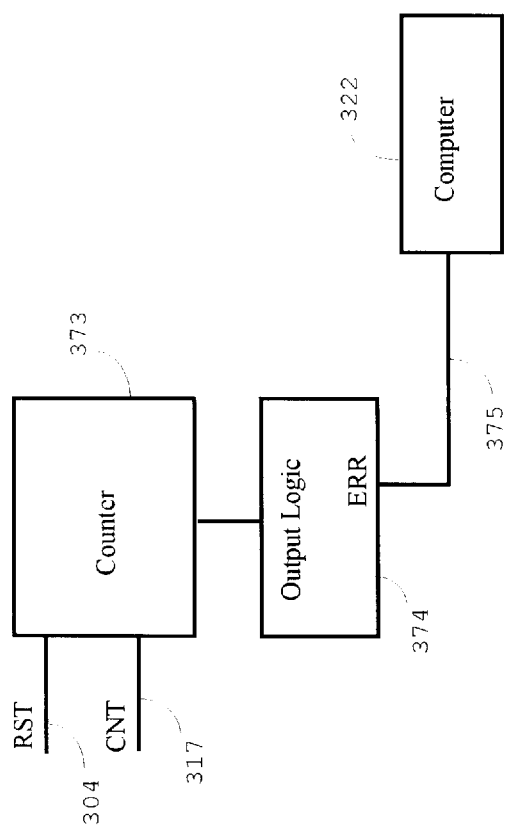
FIG. 13 shows a method for detecting errors in comparisons of phase signatures by using a counter and output logic.

Another more limited method for accomplishing error detection is to use the circuit shown in FIG. 13. This circuit increments counter 373 every time signal 317 asserts.

Counter 373 is reset by the falling edge of signal 304 (FIG. 11A). Counter 373 serves as an indicator of how many incremental phase changes have been detected per sampling period. If the output of counter 373 exceeds a predetermined value determined by output logic 374, error signal 375 is generated. This limits the maximum number of incremental phase changes allowed per sampling period, reducing the probability of measurement error. Error signal 375 is available to computer 322.

SUMMARY, RAMIFICATIONS, AND SCOPE

Accordingly, the reader will see that Digital Phase Signature Comparison can be used to build a phase detector that will measure precise increments of phase change from $-\infty$ to $\infty$ degrees (limited—of course—by the size of the accumulator). Each incremental phase change represents a spatial displacement directly proportional to the wavelength and inversely proportional to the number of binary samples. This system, therefore, has the capability to provide a standard method for determining spatial displacement using any medium where phase changes can be electronically detected, where the wavelength of a transmitted signal is directly related to spatial displacement, and where phase jitter and phase noise are minimal or inconsequential.

DPSC provides a method for measuring the absolute phase relationship of two signals if the transmitter and receiver are within one wavelength of each other, but it is not limited to measuring within one wavelength. As long as the system starts measuring within one wavelength, or starts measuring at a known synchronized starting point, the system will be capable of measuring absolute distance over multiple wavelengths.

It should be noted that if the transmitted signal is reflected off of a surface to the receiver which is positioned adjacent to the transmitter, the resolution of the system is twice that of the system utilizing straight-line transmission paths. Also, in a system utilizing 40 kHz ultrasonic transducers, the system takes 40,000 distance measurements per second—conventional ultrasonic systems only take approximately 100 measurements per second. This speed advantage makes it better adapted to acting as a velocimeter or accelerometer than existing ultrasonic rangefinders.

It should also be noted that the configuration of the transmitter and receiver affects the speed with which changes in physical displacement are detected. If the transmitter is stationary and the receiver moves, the change in position will be detected within one period of the reference signal. This configuration utilizes the minimum amount of bandwidth of the transmission medium. If the receiver is stationary and the transmitter moves, the change in position will be detected in a time frame proportional to both the distance between the transmitter and receiver, and the propagation velocity of the transmission medium. This configuration requires more transmission medium bandwidth than the previously mentioned configuration.

Digital phase signatures can be compressed or encoded so that fewer bits are needed to represent the phase signature. This would facilitate mass storage of phase data, speed in computer processing and data transmission, hardware implementation, etc.

Although the descriptions above contains many specificities, these should not be construed as limiting the scope of the invention but as merely providing illustrations of some of the presently preferred embodiments of this invention. For example, DPSC could be implemented in devices that make use of different transmission mediums. DPSC could allow existing tracking systems to accurately determine position by first using an existing tracking system to find the rough position of an object being tracked, and then using the phase signature created by DPSC to determine the precise location. Once the precise location of an object is known, the DPSC system could continue to precisely track the position of the object.

Also, devices which use transducers with slow transient response to frequency or amplitude changes can be made more accurate using DPSC. This is possible because DPSC only requires a transducer to transmit a continuous periodic signal and a receiver to receive the continuous periodic signal. This reduces the significance of the transient response of a transducer since the transducer operates under steady-state conditions. Bandwidth utilization of the transmission medium is minimized because only a carrier signal is required.

Another possible use of DPSC would be to use it as an incremental phase demodulator. Phase changes could be incrementally demodulated where the incremental phase changes could represent nibbles, bytes, or even words of data.

If both a transmitter and receiver are stationary, the system is capable of measuring changes in the propagation velocity of the transmission medium. This measurement could be used as feedback to a system, allowing compensation for the changed propagation velocity. For example, this measurement could be used to adjust the oscillator of an ultrasonic range finding system so that the wavelength of the ultrasound does not vary with atmospheric changes.

Although some of the embodiments use a computer to process the data, the actual phase displacement is accumulated in the digital counters. Thus, phase tracking can be accomplished without the computer. Conversely, if digital representations of the reference and phase-shifted signal are available to a computer, the computer could perform digital phase signature acquisition and comparison with a program.

Thus, the scope of the invention should be determined by the appended claims and their legal equivalents, rather than by the examples given.

We claim:

1. A method to digitally measure phase between a reference signal and a phase-shifted signal, comprising: means for converting said reference signal and said phase-shifted signal to binary waveforms of the same frequency, maintaining the phase relationship between the signals; means for synchronizing a pulse train to said reference signal; means for creating a digital representation of the phase between said signals using said pulse train to sample said binary phase-shifted waveform; means for storing said digital phase representations; means for comparing two digital phase representations such that incremental phase changes, the direction of those incremental phase changes, and the spatial displacement represented by the incremental phase changes are indicated; means for accumulating said incremental phase changes; and means for detecting errors in said digital phase representations and said comparisons of digital phase representations; whereby phase is incrementally measured without requiring the use of an analog to digital converter, phase locked loop, or analog phase detector.

2. The method of claim 1 wherein said means for converting said reference signal and said phase-shifted signal to binary equivalents comprises a device selected from the group consisting of amplifiers, op-amps, comparators, and zero crossing detectors.

3. The method of claim 1 wherein said means for synchronizing a pulse train to said reference signal comprises a controller that generates both said reference signal and said pulse train.

4. The method of claim 1 wherein said means for creating a digital representation of the phase comprises n-samples of said binary phase-shifted signal over ½ period of said reference signal.

5. The method of claim 1 wherein said means for creating a digital representation of the phase comprises n-samples of said phase-shifted signal over ½ period of multiple cycles of said reference signal.

6. The means of claim 1 wherein incremental differences in the comparison of two digital representations of the phase or incremental changes in digital representations of the phase comprise a representation of spatial displacement described by the following formula, where $\Delta d$ is the spatial distance represented by a single incremental phase change, $\lambda$ is the wavelength of the phase-shifted signal through a physical or electrical transmission medium, and n is the number of pulses in said digital pulse train per period of said reference signal:

$$\Delta d = \frac{\lambda}{2n}$$

7. The method of claim 1 wherein said means for comparing two digital representations of phase comprises a state machine.

8. The means of claim 7 wherein said state machine indicates incremental changes in phase and the direction of the incremental change in phase when comparing said digital representations of phase.

9. The means of claim 7 wherein said state machine indicates invalid digital phase representations and invalid comparisons between digital representations of phase.

10. The method of claim 1 wherein said means for comparing two digital phase representations comprises an integrated circuit selected from the group consisting of Read Only Memory (ROM).

11. The means of claim 10 wherein said Read Only Memory (ROM) indicates incremental changes in phase and the direction of the incremental change in phase when comparing said digital phase representations.

12. The means of claim 10 wherein said Read Only Memory (ROM) indicates invalid digital representations of phase and invalid comparisons between digital representations of phase.

13. The method of claim 10 wherein said means for comparing two digital representations of phase comprises a bit-wise comparator which uses a device selected from the group consisting of OR gates to compare said digital representations of phase bit-by-bit.

14. The means of claim 13 wherein said bit comparator indicates incremental changes in phase and the direction of the incremental change in phase when comparing said digital representations of phase.

15. The method according to claim 1 wherein said means for accumulating said incremental phase changes consists of a device selected from the group consisting of digital counters.

16. The method according to claim 1 wherein said means for accumulating said incremental phase changes consists of a counter that can count-to-n, both up or down, for a single clock input.

17. The method according to claim 1 wherein said means for detecting errors in said digital representation of phase and said comparisons between digital representations of phase comprises a Read Only Memory (ROM) that is programmed to assert an error signal.

18. The method according to claim 1 wherein said means for detecting errors in said comparisons between digital representations of phase comprises a counter and output logic that asserts an error signal when the number of incremental phase changes, for a given time interval, exceeds a predetermined value.

* * * * *